US007322269B2

(12) United States Patent
Faller et al.

(10) Patent No.: US 7,322,269 B2
(45) Date of Patent: Jan. 29, 2008

(54) HOUSING MODULE FOR A BRAKE BOOSTER

(75) Inventors: Jürgen Faller, Kahl (DE); Andreas Weiss, Steinbach/Ts. (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 10/556,524

(22) PCT Filed: May 11, 2004

(86) PCT No.: PCT/EP2004/050760

§ 371 (c)(1),
(2), (4) Date: Nov. 14, 2005

(87) PCT Pub. No.: WO2004/101341

PCT Pub. Date: Nov. 25, 2004

(65) Prior Publication Data
US 2007/0006725 A1    Jan. 11, 2007

(30) Foreign Application Priority Data

| May 14, 2003 | (DE) | ................................. 103 21 780 |
| Dec. 17, 2003 | (DE) | ................................. 103 59 175 |

(51) Int. Cl.
*F15B 9/10* (2006.01)
(52) U.S. Cl. ....................... 91/376 R; 92/128; 92/169.1
(58) Field of Classification Search .............. 91/376 R; 92/128, 169.1
See application file for complete search history.

(56) References Cited

U.S. PATENT DOCUMENTS

| 4,271,750 A | | 6/1981 | Thomas et al. |
| 4,291,534 A | * | 9/1981 | Jones ........................ 60/547.1 |
| 4,377,069 A | * | 3/1983 | Kobayashi ................ 60/547.1 |
| 4,433,614 A | | 2/1984 | Takeuchi et al. |
| 5,014,597 A | | 5/1991 | Rueffer et al. |
| 5,056,412 A | * | 10/1991 | Gautier et al. ................ 91/368 |
| 5,974,944 A | * | 11/1999 | Gautier et al. ............ 91/376 R |
| 7,082,870 B2 | * | 8/2006 | Verbo et al. .................. 92/161 |

FOREIGN PATENT DOCUMENTS

| DE | 2845794 | 4/1979 |
| DE | 2918910 | 12/1980 |
| DE | 3338458 | 5/1985 |
| DE | 19611555 | 9/1997 |
| DE | 69502703 | 11/1998 |
| EP | 0104105 | 3/1984 |
| EP | 0366504 | 5/1990 |

* cited by examiner

*Primary Examiner*—Igor Kershteyn

(57) ABSTRACT

The present device relates to a housing module 1 for a brake booster. The housing module has a housing shell 3 that accommodates a movable wall 4. The movable wall subdivides an interior space of the brake booster into a low-pressure chamber 5 and a working chamber 6. Also, a control housing 11, in which a control valve 10 is arranged, controls a pressure difference acting on the movable wall 4 and is operable of an actuating rod 9. The control valve includes two sealing seats 12, 13 which are arranged concentrically to one another and of an elastically deformable valve body 14.

12 Claims, 2 Drawing Sheets

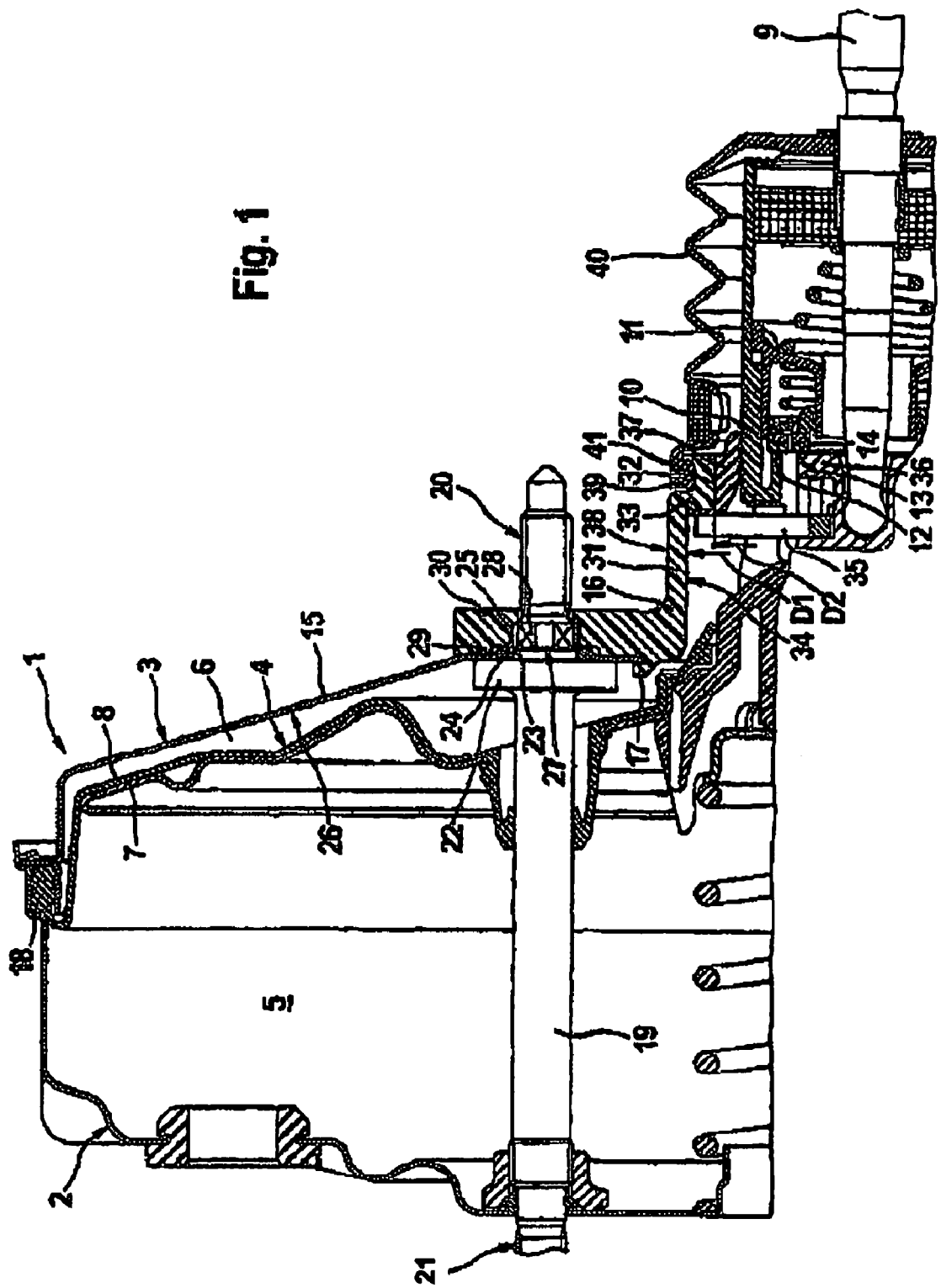

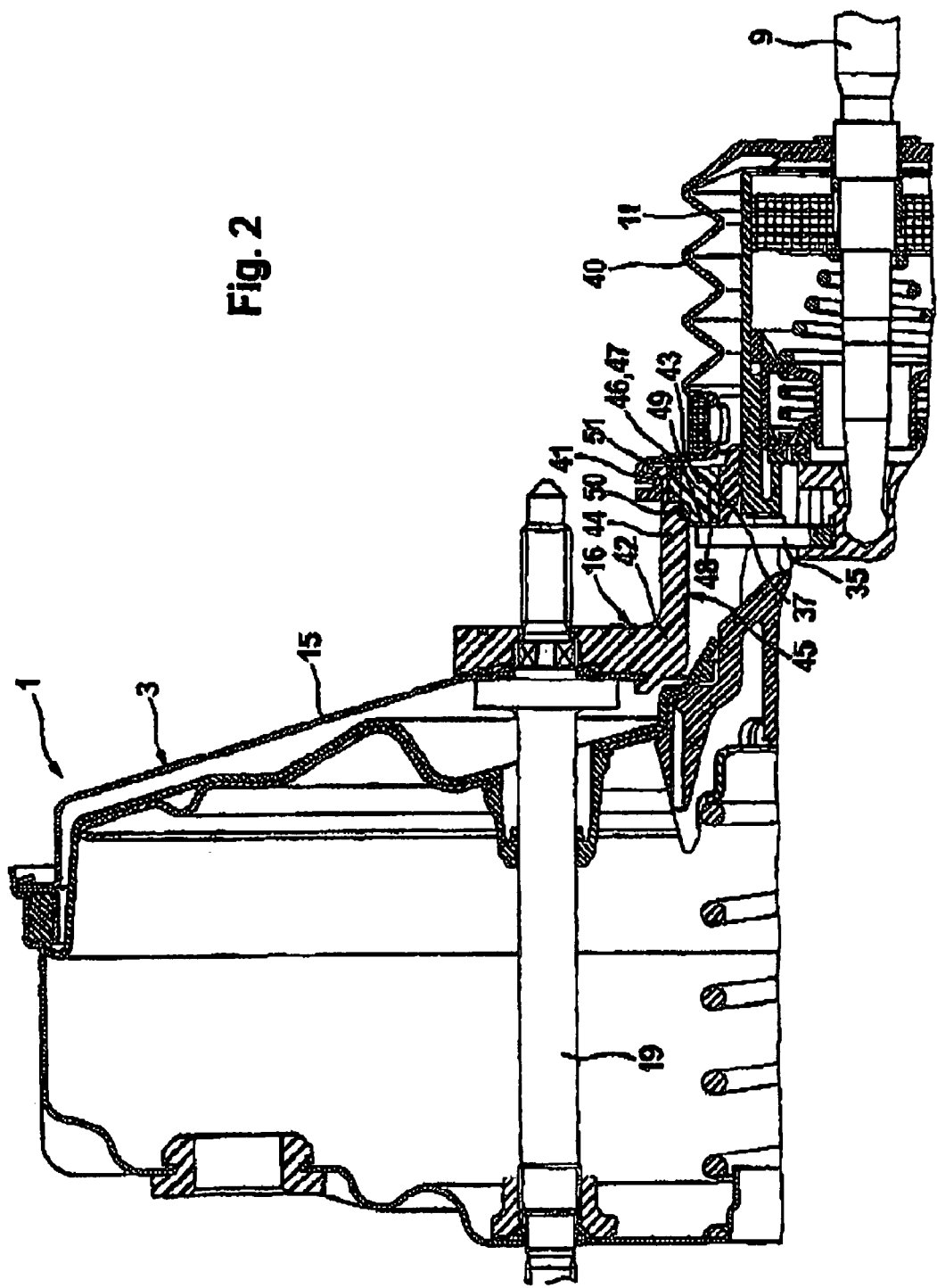

HOUSING MODULE FOR A BRAKE BOOSTER

BACKGROUND OF THE INVENTION

The present invention relates to a housing module for a brake booster comprising a housing shell for accommodating a movable wall which subdivides an interior space of the brake booster into a low-pressure chamber and a working chamber, and for accommodating a control housing in which a control valve is arranged which controls a pressure difference acting on the movable wall and is operable by means of an actuating rod, the said control valve being comprised of two sealing seats which are arranged concentrically to one another and of an elastically deformable valve body.

It is generally known in the art to manufacture the housing of a brake booster of two housing shells of the same material.

DE 28 45 794 A1 e.g. discloses a brake booster for a motor vehicle which includes a housing consisting of two housing shells, and both housing shells are made of plastic material. It is also known to make up the housing of a brake booster of two metal housing shells. As the housing is required to accommodate the known components of a brake booster and sealing of the individual components is necessary, the assembling effort is, as is known, accordingly high.

SUMMARY OF THE INVENTION

In view of the above, an object of the invention is to improve upon a housing module for a brake booster of the indicated type to such effect that the assembly of the brake booster is simplified.

According to the invention, this object is achieved in that the housing shell is composed of several components, using at least one metal housing part and at least one plastic housing part. This multi-part design of the housing shell allows simplifying the assembly because several functions are combined. In addition, the manufacture of the metal housing part is simplified due to the less complicated design.

Preferably, the plastic housing part and the metal housing part are connectible to each other by means of a bayonet-type twist lock arrangement, with the result that the two housing parts can be mounted with little effort. However, other types of connection such as a snap-in engagement are also feasible under the invention.

According to a favorable improvement of the invention, a seal is shaped on the plastic housing part as a sealing with respect to the metal housing part, said seal protecting the brake booster against ingress of moisture from an engine compartment of a motor vehicle. There is no need to mount a separate seal. Shaping the seal on the plastic housing part is e.g. carried out by vulcanization.

As a sealing with respect to a wall on a motor vehicle, an additional seal is shaped on the plastic housing part, thereby obviating the need for mounting a separate seal. The seal can e.g. be shaped by vulcanizing it onto the plastic housing part.

Preferably, a sealing element for sealing the control housing is shaped on the plastic housing part, e.g. by way of vulcanization. In prior art brake boosters, this sealing element being configured as a sliding packing is designed as an additional separate component, necessitating a high assembling effort for the assembly of the sealing element. Shaping the sealing element on the plastic housing part eliminates this effort. Further, the sealing element can be designed with a larger sealing diameter when it is shaped on the plastic housing part, with the result that channels of the control housing can be enlarged. This renders it possible to improve the response time and release time of the brake booster.

According to a favorable improvement of the invention, the plastic housing part has an abutment surface for a transverse member which limits the axial movability of a valve piston connected to the actuating rod with respect to the control housing. Thus, the plastic housing part fulfills several functions at a time.

According to an advantageous embodiment of the invention, the plastic housing part has a first cylindrical portion with a first internal diameter and a second cylindrical portion with a second internal diameter, with the first internal diameter being larger than the second internal diameter. Consequently, a circumferential step is provided on an inside surface of the plastic housing part that is used as an abutment surface for the transverse member.

In a favorable improvement of the invention, the material of the sealing element covers the circumferential step which is used as abutment surface for the transverse member. The material of the sealing element, for example any rubber material, thus serves to reduce the stop noises of the transverse member on the abutment surface.

According to another favorable embodiment of the invention, the plastic housing part includes a first component for a connection to the metal housing part as well as a second component, with the sealing element for sealing the control housing and the abutment surface being provided on the second component, and the second component can be fastened to the first component in such a fashion as to allow a relative axial change in position of the second component with respect to the first component. It is thus possible to adjust the position where the transverse member abuts on the plastic housing part, whereby e.g. lost travels of a master brake cylinder succeeding the brake booster can be reduced. The attachment of the second component which permits the axial change in position can be realized by way of a screw coupling, for example.

When the brake booster includes at least one tie rod, having ends projecting from the housing module that include in each case an attaching portion for coupling the brake booster to a master brake cylinder and wall on a motor vehicle, one end of the tie rod extends through the metal housing part and the plastic housing part for an anti-rotation mechanism of the tie rod and for securing the plastic housing part in position according to a favorable embodiment of the invention. As a result, the plastic housing part is able to accommodate torques developing in the assembly of the housing modules, for example. There is no need for additional reinforcing elements in the metal housing part in this case.

Preferably, a pleated bellows which encompasses a part of the control housing projecting from the housing module can be attached at a circumferential groove or a circumferential bead of the plastic housing part.

According to an advantageous improvement of the invention, the number of the single parts is reduced because the pleated bellows and the plastic housing part have an integral design.

BRIEF DESCRIPTION OF THE DRAWINGS

Hereinbelow, the invention will be explained by making reference to the accompanying drawings showing embodiments. In highly schematic views in the drawings:

FIG. 1 shows a partial cross-sectional view of a first embodiment of a housing module of a brake booster of the invention, and FIG. 2 shows a partial cross-sectional view of a second embodiment of a housing module of a brake booster of the invention.

DETAILED DESCRIPTION OF THE DRAWINGS

FIGS. 1 and 2 show in rough outlines a partial view of only those parts of a housing module of a pneumatic brake booster which are essential for the invention.

FIG. 1 shows a first embodiment of a housing module 1 of a pneumatic brake booster which includes two housing shells 2, 3. An interior space of the brake booster formed by the housing shells 2, 3 is subdivided by an axially movable wall 4 into a low-pressure chamber 5 and a working chamber 6. The axially movable wall 4 is composed of a sheet-metal deepdrawn diaphragm plate 7 and a flexible diaphragm 8 abutting thereon and forming a rolling diaphragm as a sealing between the outside periphery of the diaphragm plate 7 around the housing module 1.

A control valve 10 operable by an actuating rod 9 is accommodated in a control housing 11, which is sealingly guided in the housing shell 3 and carries the movable wall 4, and comprises two concentrically arranged sealing seats 12, 13 and an elastically deformable valve body 14. There is no need for reference to additional details of the partial view illustrated in FIG. 1, which are not essential for the invention, because the design and function of a brake booster of this type are generally known in the art.

As can be seen in FIG. 1, the housing shell 3 comprises a metal housing part 15 and a plastic housing part 16. In contrast thereto, the housing shell 2 is of one-part design.

The metal housing part 15 is pressed with the metal housing shell 2 by metal forming operations, with one end 18 of the diaphragm 8 being attached between the housing shell 2 and the metal housing part 15. To connect the two housing parts 15, 16, the plastic housing part 15 has projections 17 which embrace the metal housing part 15 in the form of a bayonet-type twist lock arrangement.

The brake booster has at least one tie rod 19 which sealingly extends through the housing module 1 and the movable wall 4 and projects with ends 20, 21 out of the housing module 1.

The end 21 of the tie rod 19 projecting from the housing shell 2 serves to attach a master brake cylinder (not shown) which is pressed with a flange against a plane end surface of the one-part housing shell 2. The end 20 of the tie rod 19 is used to arrange the brake booster on a wall (not shown) formed fast on a motor vehicle, the so-called splashboard, and extends through a recess 23 of the metal housing part 15. To fix the position of the tie rod 19 in the housing module 1, said tie rod includes a circumferential bead 22 which abuts on an inside surface 26 of the metal housing part 15. An annular sealing element 24 is provided as a sealing between the bead 22 and the inside surface 26 of the metal housing part 15. On the other side of the splashboard, a pedal assembly (not shown) is arranged through which the end 20 of the tie rod 19 also extends in order to be screwed e.g. to a nut, in such a fashion that the desired attachment of the brake booster-and-master cylinder assembly on the vehicle is achieved.

It becomes apparent from FIG. 1 that the plastic housing part 16 and the metal housing part 15 overlap each other in the area of the tie rod 19 and that the tie rod 19 likewise extends through a recess 25 of the plastic housing part 16.

A portion 27 adjacent to the bead 22 in the direction of the end 20 is provided with square surfaces 28 which allow a form-lock with the recess 25 of the plastic housing part 16.

This form-lock serves as an anti-rotation mechanism of the tie rod 19 and for securing the bayonet-type twist lock arrangement between the metal housing part 15 and the plastic housing part 16.

To seal the plastic housing part 16 with respect to the metal housing part 15, a seal 29 is shaped, e.g. by vulcanization, into a recess on a side of the plastic housing part 16 abutting on the metal housing part 15. On a side abutting on the splashboard, another seal 30 is provided in the plastic housing part 16 which is used to seal the plastic housing part 16 with respect to the splashboard. The brake booster is thereby protected against moisture entering from the engine compartment of the vehicle. As they are shaped on the plastic housing part 16, the seals 29, 30 are kept captive on said, whereby the need for separate seals is obviated. The assembly of the brake booster is thus facilitated.

The plastic housing part 16 includes a first cylindrical portion 31 with a first internal diameter D1 and a second cylindrical portion 32 with a second internal diameter D2, with the first internal diameter D1 being larger than the second internal diameter D2. This fact produces a circumferential step 33 on an inside surface 34 of the plastic housing 15, which step is used as an abutment surface of a transverse member 35. The transverse member 35 delimits the axial movability of a valve piston 36 connected to the actuating rod 9 with respect to the control housing 11.

In the area of the second cylindrical portion 32, a sealing element 37 designed as a sliding packing is shaped on the inside surface 34 of the plastic housing part 16, e.g. by vulcanization, and serves to seal the plastic housing part 16 with respect to the control housing 11. The sealing element 37 is then shaped on the plastic housing part 16 in such a fashion that a thin layer of the material of the sealing element 37 also covers the step 33. The stop noises of the transverse member 35 on the step 33 are thereby dampened.

Further, a circumferential groove 39, which is used to fasten a pleated bellows 40, is provided on an outside surface 38 of the plastic housing part 16 in the area of the second cylindrical portion 32. The pleated bellows 40 encompasses a part of the control housing 11 projecting from the housing module 1 and is attached in the circumferential groove 39 by means of a circumferential bead 41. No further reference is made to the function and the design of the pleated bellows 40 because the pleated bellows 40 is generally known in the art.

To further simplify the design of the brake booster, it is however possible to design the pleated bellows 40 and the plastic housing part 16 as one component.

The second embodiment of a housing module illustrated in FIG. 2 differs from the first embodiment according to FIG. 1 merely in the design of the plastic housing part 16.

The plastic housing part 16 is composed of a first component 42 which, as described according to FIG. 1, serves as a connection with the metal housing part 15 and as an anti-rotation mechanism of the tie rod 19 and the protection of the bayonet-type twist lock arrangement, and of a second annular component 43. The first component 42 includes a cylindrical portion 44, and a threaded portion 46 is provided on one end of the cylindrical portion 44 on an inside surface 45. The second component 43 also includes a thread 47 on an outside surface. The thread 47 is used to fasten the second component 43 on the inside surface 45 of the first component 42 in such a fashion that a relative axial change in position of the second component 43 with regard to the first component 42 is possible. A sealing ring 50 is provided between the two components 42, 43 to seal the screw coupling 46, 47.

The sealing element 37 is shaped on an inside surface 48 of the second component 43 to seal the control housing 11, and a lateral surface 49, which exactly as the step 33 described according to FIG. 1 is coated by a thin layer of the material of the sealing element 37, is used in this embodiment as an abutment surface for the transverse member 35.

The axial change in position of the second component 43 is used to adjust the position of the abutment surface for the transverse member 35. This allows reducing lost travels of the master brake cylinder, for example.

To attach the pleated bellows 40 on the plastic housing 16, the first component 42 has a circumferential bead 51 at the end of the cylindrical portion 44, and the circumferential bead 41 of the pleated bellows 40 embraces the latter.

LIST OF REFERENCE NUMERALS 1 housing module
2 housing shell
3 housing shell
4 movable wall
5 low-pressure booster
6 working chamber
7 diaphragm plate
8 diaphragm
9 actuating rod
10 control valve
11 control housing
12 sealing seat
13 sealing seat
14 valve body
15 metal housing part
16 plastic housing part
17 projection
18 end
19 tie rod
20 end
21 end
22 bead
23 recess
24 sealing element
25 recess
26 inside surface
27 portion
28 square surface
29 seal
30 seal
31 cylindrical portion
32 cylindrical portion
33 step
34 inside surface
35 transverse member
36 valve piston
37 sealing element
38 outside surface
39 circumferential groove
40 pleated bellows
41 circumferential bead
42 first component
43 second component
44 cylindrical portion
45 inside surface
46 threaded portion
47 thread
48 inside surface
49 lateral surface
50 sealing ring
51 circumferential bead
D1 first internal diameter
D2 second internal diameter

The invention claimed is:

1. A housing module (1) for a brake booster comprising: a housing shell (3) for accommodating a movable wall (4) which subdivides an interior space of the brake booster into a low-pressure chamber (5) and a working chamber (6), and for accommodating a control housing (11) in which a control valve (10) is arranged which controls a pressure difference acting on the movable wall (4) and is operable by means of an actuating rod (9), the control valve being comprised of two sealing seats (12, 13) which are arranged concentrically to one another and of an elastically deformable valve body (14), wherein the housing shell (3) is composed of several components, using at least one metal housing part (15) and at least one plastic housing part (16) wherein the plastic housing part (16) and the metal housing part (15) are connected to each other by a bayonet-type twist lock arrangement.

2. The housing module according to claim 1, wherein a seal (29) is shaped on the plastic housing part (16) as a sealing with respect to the metal housing part (15).

3. The housing module according to claim 2, wherein a seal (30) is shaped on the plastic housing part (16) as a sealing with respect to a wall on a motor vehicle.

4. The housing module according to claim 3, wherein a sealing element (37) for sealing the control housing (11) is shaped on the plastic housing part (16).

5. The housing module according to claim 4, wherein the plastic housing part (16) has an abutment surface for a transverse member (35) which limits the axial movability of a valve piston (36) connected to the actuating rod (9) with respect to the control housing (11).

6. The housing module according to claim 5, wherein the plastic housing part (16) has a first cylindrical portion (31) with a first internal diameter (D1) and a second cylindrical portion (32) with a second internal diameter (D2), with the first internal diameter (D1) being larger than the second internal diameter (D2), and consequently a circumferential step (33) is provided on an inside surface (34) of the plastic housing part (16) that is used as an abutment surface for the transverse member (35).

7. The housing module according to claim 6, wherein the sealing element (37) is provided on the inside surface (34) of the plastic housing part (16) In the area of the second cylindrical portion (32).

8. The housing module according to claim 7, wherein the the material of the sealing element (37) covers the circumferential step (33).

9. The housing module according to claim 8, wherein the plastic housing part (16) includes a first component (42) for a connection to the metal housing part (15) and a second component (43), with the sealing element (37) for sealing the control housing (11) and the abutment surface being provided on the second component (43), and the second component (43) can be fastened to the first component (42) in such a fashion as to allow a relative axial change in position of the second component (43) with respect to the first component (42).

10. The housing module according to claim 1, wherein the brake booster includes at least one tie rod (19) having ends (20, 21) that project from the housing module (1) and Include in each case an attaching portion for coupling the brake booster to a master brake cylinder and a wall on a motor vehicle, and one end (20) of the tie rod (19) extends through the metal housing part (15) and the plastic housing part (16) for an anti-rotation mechanism of the tie rod (19) and for securing the plastic housing part (16) in position.

11. The housing module according to claim 1, wherein a pleated bellows (40) which encompasses a part of the control housing (11) projecting from the housing module (1) can be attached at a circumferential groove (39) or a circumferential bead (51) of the plastic housing part (16).

12. The housing module according to claim 11, wherein the pleated bellows (40) and the plastic housing part (16) have an integral design.

* * * * *